United States Patent [19]

Thompson

[11] 4,453,399

[45] Jun. 12, 1984

[54] LEAK DETECTOR

[75] Inventor: Clifford F. Thompson, Weston, Canada

[73] Assignee: Cliffside Pipelayers, A Division of Banister Continental Ltd., Scarborough, Canada

[21] Appl. No.: 356,936

[22] Filed: Mar. 10, 1982

[30] Foreign Application Priority Data

Feb. 1, 1982 [CA] Canada .................................. 395275

[51] Int. Cl.³ ............................................. G01M 3/06
[52] U.S. Cl. .................................. 73/40.5 R; 73/49.1
[58] Field of Search ...................... 73/40.5 R, 40, 49.1

[56] References Cited

U.S. PATENT DOCUMENTS

| 3,103,910 | 9/1963 | Smith et al. | 73/40 X |
| 3,177,702 | 4/1965 | Andersson | 73/40 |
| 3,221,540 | 12/1965 | Kilbourn | 73/40 X |
| 4,320,653 | 3/1982 | Bernhardt | 73/40 |

FOREIGN PATENT DOCUMENTS

| 539204 | 1/1931 | Fed. Rep. of Germany | 73/40 |
| 1075861 | 10/1954 | France | 73/40 |
| 1972 | of 1896 | United Kingdom | 73/40.5 R |

Primary Examiner—Gerald Goldberg
Assistant Examiner—Thomas P. Noland
Attorney, Agent, or Firm—Sim & McBurney

[57] ABSTRACT

A leak detecting method utilizes a pressure vessel for holding gas under pressure and a transparent chamber partly filled with liquid. A conduit defines a gas pathway from the vessel to a location within the chamber which is beneath the surface of the liquid. A fitting is provided for connection to a system which is to be tested and a further conduit connects the fitting through a first valve to a location within the liquid chamber, and through a second valve with the interior of the vessel. The fitting is connected to a system to be tested, and the first valve is closed. The system is pressurized to fill the conduit means and allow gas entering the conduit means to pass through the second valve into the interior of the vessel. The second valve is enclosed, thus isolating the vessel from the system. After a pause to allow leakage in the system to lower the pressure, the first valve is open and if gas bubbles in the liquid, then leakage has occurred.

1 Claim, 2 Drawing Figures

LEAK DETECTOR

This invention relates generally to lead testing apparatus, and has to do particularly with apparatus of this kind suitable for testing for leakage in natural gas services to houses and other buildings.

REFERENCE TO PRIOR ART

This invention constitutes an improvement over the apparatus disclosed in U.S. Pat. No. 3,221,540, issued Dec. 5, 1965, and U.S. Pat. No. 3,103,910, issued Dec. 17, 1963.

BACKGROUND OF THIS INVENTION

When a pipe installer installs a natural gas service to a house or other building, the service must be checked for leakage, before connecting the service into the main. Various devices are available on the market for accomplishing this testing, but most utilize simple gauges which are used, after the service line has been filled with a gaseous material under pressure, to show directly any drop in pressure in the service line. However, for very small leakages, which none-the-less could be very dangerous over a long period of time, the amount of leakage is often so small that it cannot be detected on a normal pressure gauge.

It is therefore desirable to be able to provide a system which is more sensitive to small leakages.

GENERAL DESCRIPTION OF THIS INVENTION

Accordingly, it is an aspect of this invention to provide a method of detecting leakage in a pressurized system, which is capable of detecting very small quantity leakages from a pressurized gas system.

More particularly, this invention provides a method of detecting leakage in a pressurized system, utilizing a leak detecting apparatus which includes a pressure vessel of fixed volume for holding gas under pressure, a transparent chamber mounted to the vessel partly filled with liquid, means defining a gas pathway from the vessel to a location within the chamber which is beneath an upper surface of the liquid, and a fitting for connection to a system which is to be tested for leakage under pressurized gas. Conduit means different from the gas pathway is connected from the fitting through a first valve to a location within the chamber above the upper surface of the liquid and through a second valve with the interior of the vessel. The method involves the steps of connecting the fitting to the system which is to be tested for leakage under pressurized gas, then closing the first valve, then pressurizing the system with gas to fill the conduit means and allowing gas entering the conduit means to pass through the second valve into the interior of the vessel, thereby equalizing the pressure between the vessel and the system. Then, the second valve is closed, thus isolating the vessel from the system. Time is allowed to pass so that any leakage in the system will lower the pressure viv-a-vis the pressure in the vessel, then the first valve is opened and a determination as to whether gas passes from the vessel into the conduit is made by observing whether bubbled gas escapes from the location within the chamber which is beneath the upper surface of the liquid.

GENERAL DESCRIPTION OF THE DRAWINGS

One embodiment of this invention is illustrated in the accompanying drawings in which like numerals denote like parts throughout the several views, and in which.

DETAILED DESCRIPTION OF THE DRAWINGS

Figure 1:
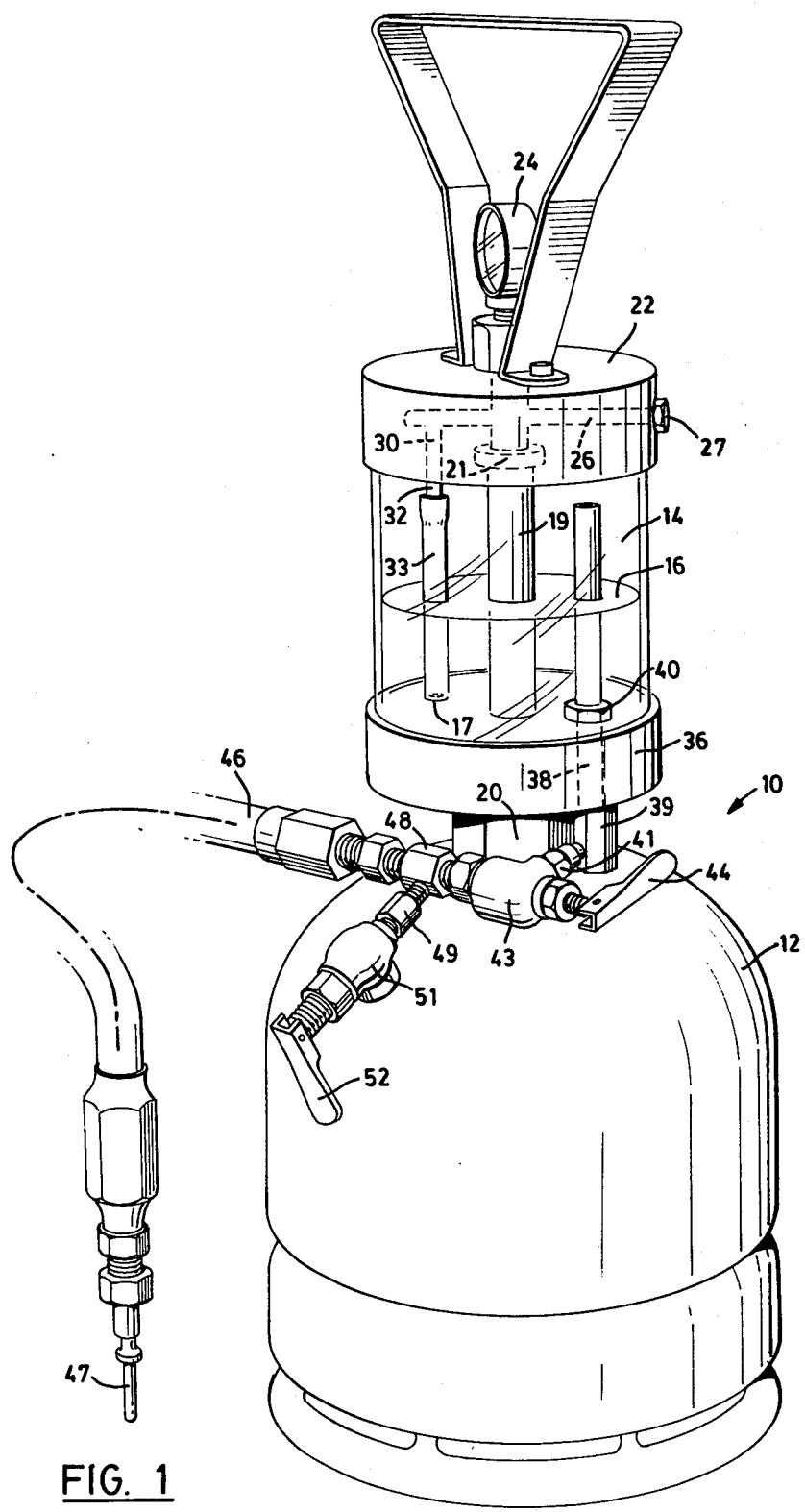
FIG. 1 is a perspective view of the apparatus of this invention.

Attention is first directed to FIG. 1, which shows a leak detecting apparatus generally at the numeral 10, the apparatus including a pressure vessel 12 for holding gas under pressure, and a transparent chamber 14 partly filled with a liquid 16 which will not foam when bubbles pass through it. A suitable liquid is oil.

Means are provided to define a gas pathway from the interior of the vessel 12 to a location 17 which is within the chamber 14 and beneath the surface of the liquid 16. More specifically, there is provided a central, hollow pipe 19 which connects through a fitting 20 with the interior of the vessel 12. The pipe 19 is connected to a passageway 21 vertically within a solid upper member 22, the passageway 21 extending to the upper surface of the member 22 and connecting to a pressure gage 24 through conventional means. A horizontal passageway 26, closed by plug 27, intersects the vertical passageway 21 within the member 22, and also intersects a secondary vertical passageway 30 which connects with an internally threaded bore adjacent the under surface of the member 22, into which a tube connector 32 is screwed. Attached to the tube connector is a short piece of flexible tubing 33, terminating in an open lower end at the location 17. Thus, the interior of the pipe 19 is in free communication with the pressure gage 24 and with the flexible tube 33.

The chamber 14 is adapted to be pressurized to the same pressure as that within the pressure vessel 12, which can be in the area of 200 psi. For this reason, the chamber 14 needs to be constructed to withstand such pressure. Preferably, the transparent outer cylindrical wall of the chamber 14 is constructed of high-strength thick-wall acrylic pipe, and the latter is sealed against the top member 22 and a bottom member 36 with suitable O rings or similar seals (not shown), the two members 22 and 36 being held together by the pipe 19, which is treadably engaged with both of them. Thus, the pipe 19 serves as a structural member as well as a conduit-defining member.

Extending through the lower member 36 is a further vertical passageway 38 which is in communication with a lower fitting 39 and a tube connector 40. Both the fitting 39 and the tube connector 40 are screwed into suitable tapped end regions of the passageway 38, this being a construction well known in the art. The fitting 39 has an interior bore which communicates laterally with a fitting 41 connected to a normally closed first valve 43 which is open by lever 44. Through a series of high-pressure gas connections, the downstream orlow-pressure side of the valve 43 is connected to a conduit 46 which terminates in a fitting 47 which is adapted for connection to a system which is to be tested for leakage under pressurized gas. The high pressure fittings adjacent the valve 43 include a hexagonal member 47 which is laterally tapped to receive a threaded hexagonal fitting 49 which connects to a normally closed second valve 51, the latter also being opened manually by depressing a lever 52. The valve 51 is adapted to communicate the pressure within the conduit 46 with the interior of the pressure vessel 12.

The fitting 47 is a standard item known in the art for rapid attachment and detachment from a pressurized system, in air tight manner, and need not be described in this disclosure.

Figure 2:
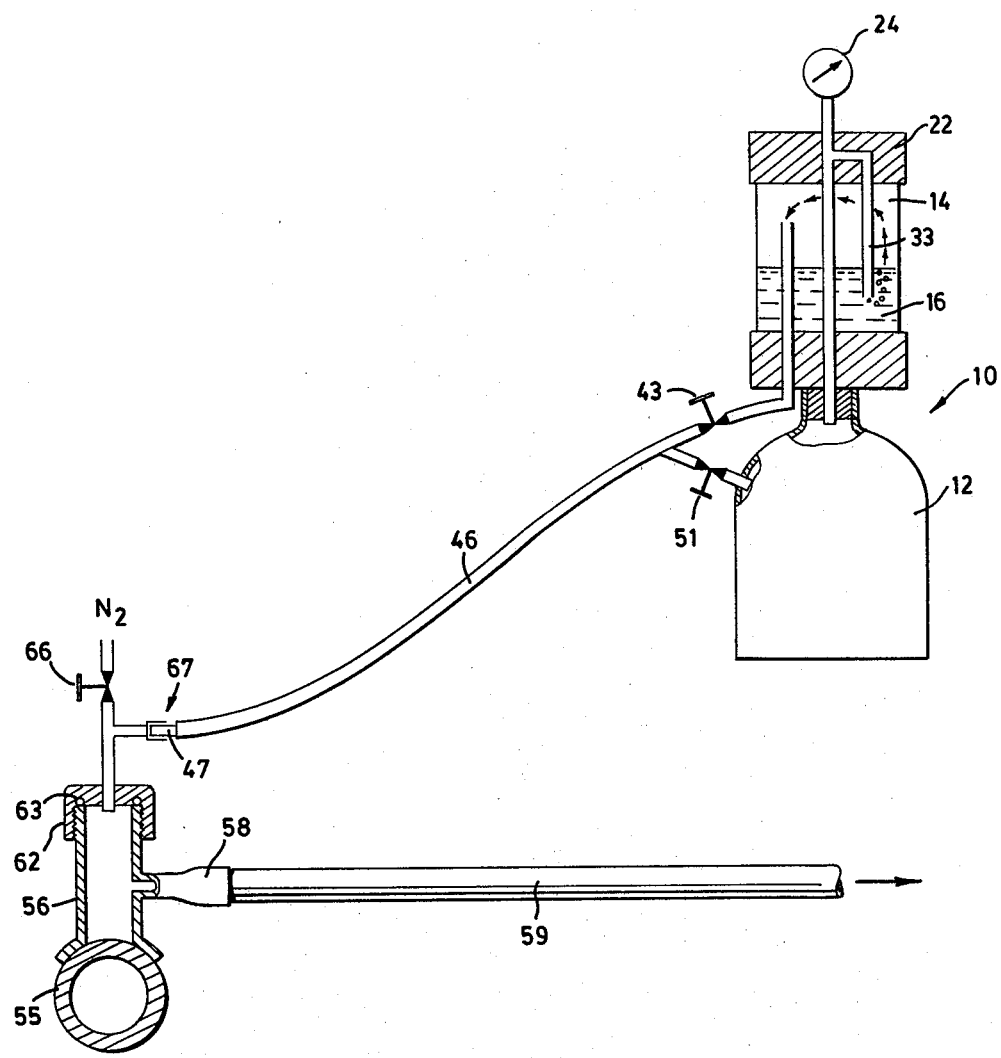
FIG. 2 shows the apparatus of this invention schematically along with a pressurized system which is being tested for leakage.

The essential portions of this apparatus are shown schematically in FIG. 2, to which attention is now directed. In FIG. 2, a gas main is illustrated at 55. A T-fitting 56 is shown in place and thermoplastically welded to the main 55, but prior to puncturing the wall of the main to communicate the T-fitting with the interior of the main. The T-fitting includes a connection 58 to which the house or building surface line 59 is thermoplastically welded in known fashion. A cap 62 closes the top of the T-fitting 56, and a seal is effected by an O ring 63, as is well know. Through the cap 62 is provided a connection to a valve 66 through which Nitrogen under pressure (or any other suitable gas) can be admitted in order to pressurize the T-fitting 56 and the service line 59. Between the valve 56 and the cap 62 is provided the releasable connection 67 mentioned earlier, which allows the fitting 47 to be inserted and connected in an air-tight manner. By inserting the fitting 47, the conduit 46 is placed into communication with the interior of the T-fitting 56 and the service line 59 to be tested.

In operation, the valve 43 is first closed, and preferably both the valves 43 and 51 are closed, prior to the insertion of the fitting 47, and prior to admission of pressurized Nitrogen or other gas through the valve 56 into the service line 59. Then, the fitting 47 is inserted, the pressurized gas is admitted to the system. If both the valves 43 and 51 are closed at this time, no gas will enter the tester shown at upper right in FIG. 2. The valve 51 is then opened, to admit the pressurized gas to the vessel 12. The source of pressurized Nitrogen or other gas may remain connected at this time with the valve 66 still open. Alternatively, the valve 51 may be open from the start, so that the filling of the system through the valve 66 automatically fills the pressure vessel 12 simultaneously. Because of the open connection between the vessel 12 and the bottom of the tube 33, there will be a small amount of bubbling as gas enters the chamber 14 in order to pressurize it to the same level as the pressure vessel 12. Throughout this stage the valve 43 continues to remain closed.

Then the valve 66 is closed to seal off the system being tested for leakage. Simultaneously, the valve 51 is closed so that the pressure vessel 12 is isolated from the remainder of the system (both the valves 51 and 43 being closed at this stage).

A certain amount of time is allowed to elapse, typically two to five minutes, during which any leakage from the house service line 59, or at the T-fitting 56, will lower the pressure in the line 59 and also in the conduit 46.

After the time lapse, the valve 43 is opened, while the valve 51 remains shut. If there is a drop in pressure in the conduit 46 by comparison with the pressure within the vessel 12 and chamber 14, these two will attempt to equalize by gas passing from the pressure vessel 12 to the bottom of the tube 33, thus creating bubbles in the liquid 16 which can be noted visually. This will indicate that there has been leakage in the line 59, and appropriate steps to rectify the leakage can be taken.

While a particular embodiment of this invention has been illustrated in the accompanying drawings and described in the foregoing disclosure, those skilled in the art will appreciate that changes and modifications may be made therin, without departing from the essence of the invention as is set forth in the accompanying claims.

I claim:

1. A method of detecting leakage in a pressurized system, utilizing a leak detecting apparatus which includes a pressure vessel of fixed volume for holding gas under pressure, a transparent chamber mounted to the vessel partly filled with liquid, means defining a gas pathway from the vessel to a location within the chamber which is beneath an upper surface of the liquid, a fitting for conncetion to a system which is to be tested for leakage under pressurized gas, and conduit means different from said gas pathway connecting the fitting through a first valve to a location within the chamber above the upper surface of the liquid and through a second valve with the interior of the vessel;

the method including the steps:

connecting the fitting to the system which is to be tested for leakage under pressurized gas, closing said first valve, pressurizing the system with gas to fill the conduit means and allowing gas entering the conduit means to pass through the second valve into the interior of the vessel, thereby equalizing the pressure between the vessel and the system, closing the second valve, and thereby isolating the vessel from the system, allowing time to pass so that any leakage in the system will lower the pressure vis-a-vis the pressure in the vessel, then opening said first valve and determining whether gas passes from the vessel into the conduit by observing whether bubbled gas escapes from said location within the chamber which is beneath the upper surface of the liquid.

* * * * *